United States Patent
Koved et al.

(10) Patent No.: US 10,652,225 B2
(45) Date of Patent: May 12, 2020

(54) QUEUE MANAGEMENT AND LOAD SHEDDING FOR COMPLEX AUTHENTICATION SCHEMES

(71) Applicant: International Business Machines Corporation, Armonk, NY (US)

(72) Inventors: Lawrence Koved, Pleasantville, NY (US); Bo Zhang, Hoboken, NJ (US)

(73) Assignee: International Business Machines Corporation, Armonk, NY (US)

(*) Notice: Subject to any disclaimer, the term of this patent is extended or adjusted under 35 U.S.C. 154(b) by 338 days.

(21) Appl. No.: 14/748,266

(22) Filed: Jun. 24, 2015

(65) Prior Publication Data

US 2015/0381598 A1 Dec. 31, 2015

Related U.S. Application Data

(60) Provisional application No. 62/018,913, filed on Jun. 30, 2014.

(51) Int. Cl.
| | |
|---|---|
| *H04L 29/06* | (2006.01) |
| *G06F 15/16* | (2006.01) |
| *G06F 7/04* | (2006.01) |
| *H04W 12/06* | (2009.01) |
| *H04L 9/32* | (2006.01) |

(52) U.S. Cl.
CPC ............ *H04L 63/08* (2013.01); *H04L 63/105* (2013.01); *H04L 63/20* (2013.01); *H04W 12/06* (2013.01); *H04L 9/32* (2013.01)

(58) Field of Classification Search
CPC ....... H04L 63/08; H04L 63/105; H04L 63/20; H04L 9/32; H04W 12/06
USPC .......................................................... 726/3
See application file for complete search history.

(56) References Cited

U.S. PATENT DOCUMENTS

| | | | | |
|---|---|---|---|---|
| 7,290,056 | B1* | 10/2007 | McLaughlin, Jr. | H04L 43/0852 709/201 |
| 8,285,999 | B1* | 10/2012 | Ghose | H04L 9/3234 713/170 |
| 8,943,083 | B2* | 1/2015 | Aravamudan | G06F 17/30595 707/758 |
| 2006/0167784 | A1* | 7/2006 | Hoffberg | G06Q 20/401 705/37 |
| 2007/0206615 | A1* | 9/2007 | Plamondon | H04L 1/1887 370/401 |
| 2009/0279689 | A1* | 11/2009 | Ciet | H04L 9/3236 380/28 |
| 2009/0300364 | A1 | 12/2009 | Schneider et al. | |

(Continued)

OTHER PUBLICATIONS

M. Karnana; Biometric personal authentication using keystroke dynamics: A review; vol. 11, Issue 2, Mar. 2011, pp. 1565-1573.*

(Continued)

*Primary Examiner* — Monjur Rahim
(74) *Attorney, Agent, or Firm* — Richard A. Wilhelm (57) ABSTRACT

Using a stochastic queuing model to determine adjustments to be made to authentication system operation. In light of operational parameter values and the stochastic queuing model, a determination is made that adjusting the value of a particular parameter for handling authentication requests is likely to improve some aspect of system performance, and the request handling parameter is adjusted accordingly.

20 Claims, 8 Drawing Sheets

(56) References Cited

U.S. PATENT DOCUMENTS

| | | | |
|---|---|---|---|
| 2011/0044264 A1* | 2/2011 | Chen | H04W 36/245 370/329 |
| 2012/0033612 A1* | 2/2012 | Jazra | H04L 47/14 370/328 |
| 2012/0060214 A1* | 3/2012 | Nahari | G06F 21/316 726/19 |
| 2012/0180119 A1 | 7/2012 | Bessis et al. | |
| 2012/0324546 A1 | 12/2012 | Forster et al. | |
| 2013/0007259 A1* | 1/2013 | Pacheco-Sanchez | G06F 11/3447 709/224 |
| 2013/0167207 A1* | 6/2013 | Davis | G06F 21/316 726/5 |
| 2014/0215443 A1* | 7/2014 | Voccio | G06F 11/3612 717/128 |

OTHER PUBLICATIONS

Abi-Char et al , "A Dynamic Trust-Based Context-Aware Authentication Framework With Privacy Preserving", 2010, 14 pages.

Bao et al., "Smart Phone Use by Non-Mobile Business Users", MobileHCI 2011, Aug. 30-Sep. 2, 2011, Stockholm, Sweden, Copyright 2011 ACM 978-1-4503-0541-9/11/08-09, pp. 445-454.

Chen et al., "Modeling and Performance Analysis of User Behavior Authentication using Stochastic Petri Nets", 2012 International Conference on Industrial Control and Electronics Engineering, IEEE Computer Society, DOI 10.1109/ICICEE.2012.375, pp. 1421-1425.

Clark et al., "Risk Based Access Control With Uncertain and Time-Dependent Sensitivity", Proceedings of the 2010 International Conference on Security and Cryptography (SECRYPT), Jul. 26-28, 2010, pp. 1-9.

Gross et al., "Fundamentals of Queueing Theory", Wiley, 3rd Edition, Feb. 1998, ISBN: 0471170836.

Internet Society et al., "DASS—Distributed Authentication Security Service (RFC1507)", An IP.com Prior Art Database Technical Disclosure, Original Publication Date: Sep. 1, 1993, IP.com No. IPCOM000002336D, IP.com Electronic Publication: Sep. 12, 2000, 110 pages.

Internet Society et al., "Remote Authentication Dial in User Service (RADIUS) (RFC2058)", An IP.com Prior Art Database Technical Disclosure, Original Publication Date: Jan. 1, 1997, IP.com No. IPCOM000002609D, IP.com Electronic Publication: Sep. 13, 2000, 52 pages.

Nagata et al., "Multitasking and Interruptions During Mobile Web Tasks", Proceedings of the Human Factors and Ergonomics Society 47th Annual Meeting—2003, pp. 1341-1345.

Skracic et al., "Knowledge based authentication requirements", MIPRO 2013, May 20-24, 2013, Opatija, Croatia, pp. 1116-1120.

Taylor et al., "An Introduction to Stochastic Modeling", 3rd Edition, Copyright © 1998, 1994, 1984 by Academic Press, pp. 1-5, <http://matap.dmae.upm.es/WebpersonalBartolo/Probabilidad/KarlinTaylorIntrodStochModeling.pdf>.

Trafton et al., "Huh, what was I doing? How people use environmental cues after an interruption", In Proceedings of the Human Factors and Erognomics Society, HFES, Orlando, FL, USA, pp. 468-472.

Trewin et al., "Biometric Authentication on a Mobile Device: A Study of User Effort, Error and Task Disruption", ACSAC '12 Dec. 3-7, 2012, Orlando, Florida USA , Copyright 2012 ACM 978-1-4503-1312—Apr. 12, 2012, 10 pages.

Van De Ven et al., "Distributed Backup Scheduling: Modeling and Optimization", IEEE INFOCOM 2014—IEEE Conference on Computer Communications, pp. 1644-1652.

"Stochastic", Wikipedia, the free encyclopedia, page was last modified on May 31, 2015, at 02:00, 8 pages, <http://en.wikipedia.org/wiki/Stochastic>.

U.S. Appl. No. 62/018,913, entitled "Improving Usability of Complex Authentication Schemes Via Queue Management and Load Shedding", filed Jun. 30, 2014.

IBM, List of IBM Patents or Patent Applications Treated as Related, Appendix P, dated Aug. 2, 2019, 2 pages.

U.S. Appl. No. 16/528,720, dated Aug. 1, 2019, entitled: "Queue Management and Load Shedding for Complex Authentication Schemes".

* cited by examiner

| User Class / Authentication Confidence Class | Authentication Challenge Choice Sets |
|---|---|
| 1 | {a,b,c}, {a,b,d} |
| 2 | {a,b,c}, {a,b,d}, {b,d,e}, {c,d,e} |
| 3 | {a,b}, {a,c}, {a,d}, {a,e}, {b,c}, {b,d}, {b,e}, {c,d} |
| 4 | {a}, {c}, {d}, {e}, {b,c}, {b,d}, {b,e}, {c,d} |
| 5 | {a}, {b}, {d}, {e}, {f} |
| 6 | |

QUEUE MANAGEMENT AND LOAD SHEDDING FOR COMPLEX AUTHENTICATION SCHEMES

STATEMENT REGARDING FEDERALLY SPONSORED WORK

This invention was made with United States Government support under contract number FA8750-12-C-0265 entered into with the following United States Governmental Agency: U.S. Air Force Office of Scientific Research. The United States government has certain rights to this invention.

BACKGROUND

The present invention relates generally to the field of user authentication systems, and more particularly to authentication system performance.

Computer access control is a process for controlling access to computing resources. Computer access control includes authentication, by which an attempt is made to verify the proclaimed identify of a given user. If the user's identity is deemed authentic, the user is granted access to the requested resources. "Authentication" as used herein should be understood to encompass both verification-only scenarios and scenarios that include both verification and the subsequent access approval or denial.

Taylor and Karlin, in *An Introduction to Stochastic Modeling* (3rd ed., 1998), pp. 2-5, state: "A stochastic model predicts a set of possible outcomes weighted by their likelihoods, or probabilities . . . . A stochastic process is a family of random variables $X_t$, where t is a parameter running over a suitable index set T . . . . In a common situation, the index t corresponds to discrete units of time, and the index set is $T=\{0, 1, 2, \ldots\}$ . . . but different situations also frequently arise . . . . Stochastic processes are distinguished by their state space, or the range of possible values for the random variables X, by their index set T, and by the dependence relations among the random variables $X_t$."

SUMMARY

According to an aspect of the present invention, there is a method, computer program product and/or system that performs the following steps (not necessarily in the following order): (i) obtains a stochastic queuing model of a computerized authentication system, a set of preferences for handling authentication requests, and a set of operational parameter values; (ii) determines, based at least in part on the model and the operational values, that adjusting a value of a first request handling parameter will improve a probable degree to which the authentication system will meet the set of preferences; and (iii) responsive to the determination that adjusting the value of the first request handling parameter will improve the probable degree to which the authentication system will meet the set of preferences, adjusts the first request handling parameter of the computerized authentication system.

DETAILED DESCRIPTION

Some embodiments of the present invention use a stochastic queuing model of an authentication system to quantitatively solve a joint optimization and control problem to select authentication factors and factor combinations that effectively balance tradeoffs among security, usability, and cost. Based on analyzing the stochastic queuing model for system performance, some embodiments of the present invention relieve system stress and/or reduce perceived system response time through effective queue management, adding resources to service queued requests or shedding load such as by presenting an authentication challenge to a user before that user actually makes an authentication request and/or by dynamically adjusting the set of authentication challenges presented to a given class of authentication requests.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
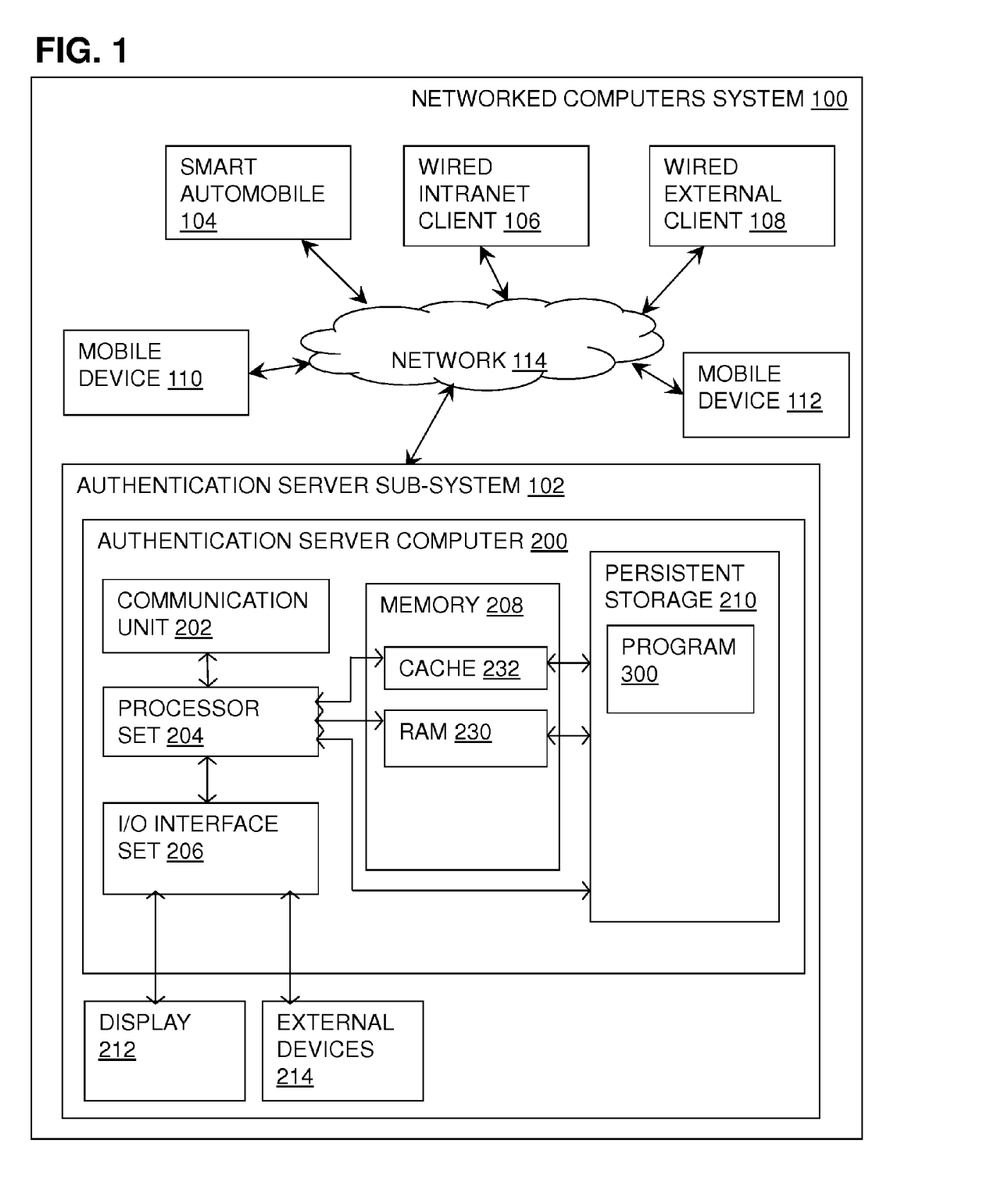
FIG. 1 is a block diagram of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: authentication server sub-system 102; smart automobile sub-systems 104; wired intranet client 106, wired external client 108, and mobile devices 110 and 112; communication network 114; authentication server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, cloud-based computer, a personal digital assistant (PDA), a smart phone, or any programmable electronic device capable of communicating with the client sub-systems via network 114. Alternatively, sub-system 102 may be a collection of computers or processing units. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
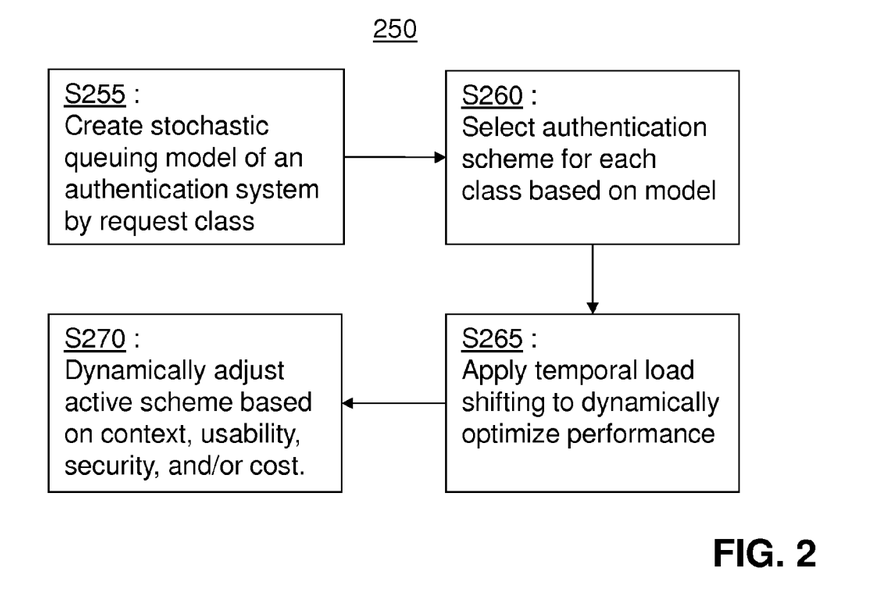
FIG. 2 is a flowchart showing a first embodiment method performed, at least in part, by the first embodiment system.
Figure 3:
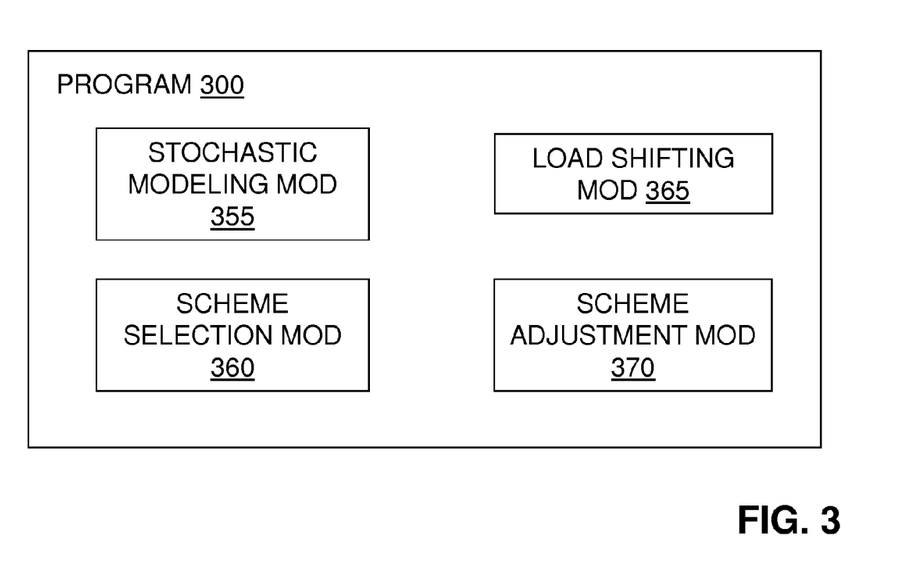
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated processing modules ("mods") will now be discussed, over the course of the following paragraphs, with extensive reference to FIG. 2 (for the method step blocks) and FIG. 3 (for the processing mods).

Processing begins at step S255, where authentication stochastic modeling module ("mod") 355 constructs a stochastic queuing model of a system for authenticating users, such as those associated with smart automobile 104, wired intranet client 106, wired external client 108, and mobile devices 110 and 112 (see FIG. 1). In some cases, the "user" may be the device itself or software executing on the device rather than a human or artificial intelligence distinct from the device. User authentication requests may be divided into classes. In this embodiment, for example, there are four request classes—S, I, E, and M—corresponding to the four device types of FIG. 1—smart automobile, wired intranet client, wired external client, and mobile device, respectively—from which requests may originate. Numerous other classification schemes are possible, however. For example, schemes might take into account geographic location of request origination, authorization scope and sensitivity, history of unauthorized access attempts, capabilities of the requesting device, and so on.

In addition to request classes, the model also includes multiple service types, or authentication method elements, where each service type corresponds to a type of authentication challenge. Service types are often divided into three categories, or classes: (i) something a user knows (such as a password); (ii) something a user has (such as a hardware security token); and (iii) something the user is or does (such as biometric identifiers). In this embodiment, there are three challenge types: username and password (U), software security token (T), and facial recognition (F). Those of skill in the art will recognize numerous other possible challenges, including but not limited to: hardware tokens, fingerprints, security questions, CAPTCHA-type challenges, personal identification numbers (PINs), retinal scans, behavioral analysis, and so on. Each class of requests may be assigned to zero or more service types, and each service type may be applied to service zero or more classes of requests.

The stochastic queuing model probabilistically quantifies overall authentication delay by representing the authentication process as a series of queues parameterized by request arrival rates and servicing speeds. In the simplistic model of this embodiment, the process for a given request has only a single queue, with servicing speed probability distributions prescribed for each service type and arrival rate distributions (which may vary over time) derived from the arrival rates of requests from the class or classes assigned to each service type. For example, with class S assigned service type T, class M to U and F, class I to T and F, and class E to type U, arrival rates for service type U would be derived from the arrival rate distributions for requests from classes E and M. By modeling authentication system delays mathematically, along with information about resource costs and the effectiveness of authentication challenge alternatives, a designer or even the system itself can quantitatively evaluate tradeoffs among security, usability, and cost.

Processing proceeds to step S260, where authentication scheme selection mod 360 selects an authentication scheme for each class based on the stochastic model from the previous step. The overall scheme includes the actual assignments of request classes to service types described above (the active scheme), but also includes possible alternative assignments for each class ranked in order of preference. For instance, class M requests are preferentially assigned to service types U and F in the selected scheme (this is an example of a request handling parameter), but the scheme also specifies a permissible alternative assignment to types U and T during times when the facial recognition engine queue is so long that prescribed service times cannot be maintained and additional resources cannot be added in a cost- or time-effective fashion (for example, because the system is not implemented in a dynamic cloud environment). Alternatively, this step may only select an active scheme as the overall scheme, may select the active scheme from a pre-assigned overall scheme (that is, where the various acceptable alternatives for each class are already provided), or may only select schemes for those classes for which schemes are presently required (say, because requests from those classes have been received). If the active scheme is pre-assigned, this step may be omitted.

Figure 4:
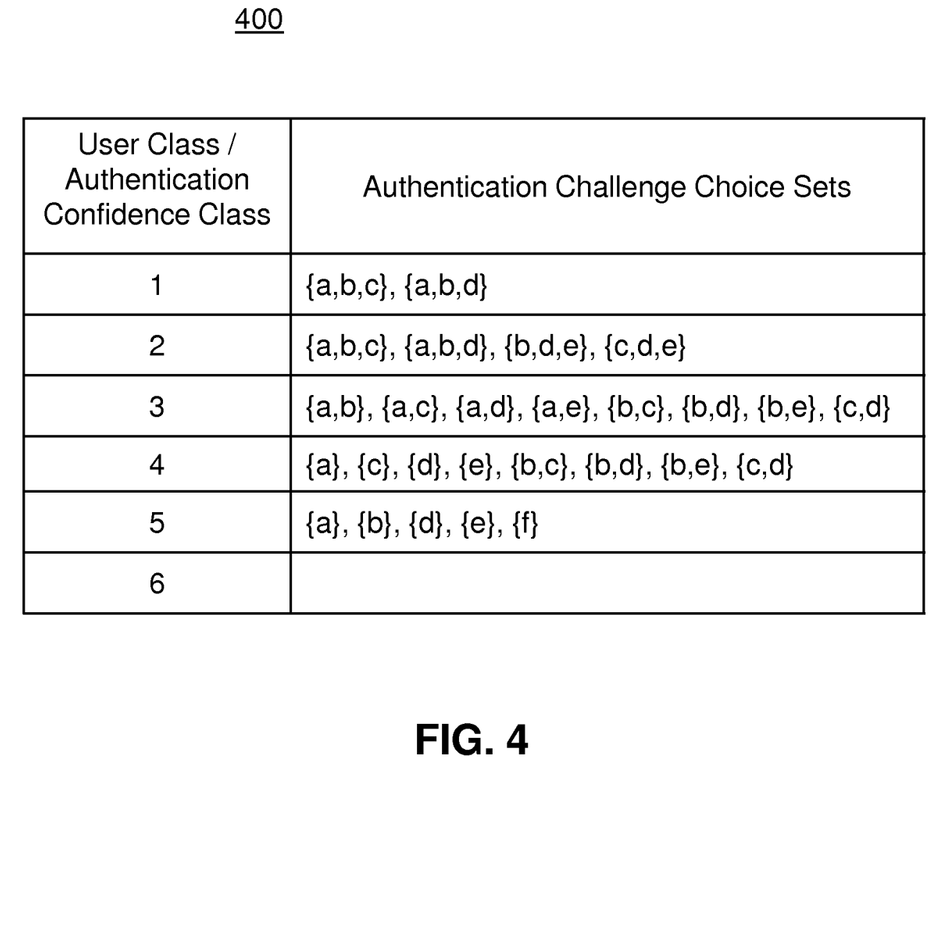
FIG. 4 is a table generated and/or used by a second embodiment system according to the present invention.

Shown in FIG. 4 is table 400, illustrating an overall authentication scheme for a system with six classes. In this system, each class is associated with a number of authentication challenge set alternatives that have been determined to be acceptable for that class. For instance, class 1 requests may be authenticated by the service type set a, b, and c, or may alternatively be authenticated by the service type set a, b, and d. Note that for class 6, no service types have been established. From this overall scheme, an example active scheme is: 1:{a,b,c}; 2:{b,d,e}; 3: {c,d}; 4: {e}; 5: {f}; and 6:{currently undefined}.

Returning to the embodiment of FIGS. 1-3, the active and overall schemes are selected based on solving a joint stochastic optimization and control problem represented by the stochastic system model of step S255, which takes into account various parameters to evaluate tradeoffs among security, usability, and cost. Security parameters include required authentication confidence level (a preference for handling authentication requests), probability of an imposter being mistakenly authenticated by a given service type or combination, and probability of a genuine user not being authenticated by a given service type or combination. Alternatively or in addition, they may include probability of an imposter attempting to authenticate, potential damages that could result from imposter authentication, and other such parameters. Usability parameters include time required for a user to respond to a security challenge, ability of a user to respond (for example, trying to type a password while driving would have a low usability value), time for the system to process the user response(s) and complete authentication, and maximum authentication processing delay (another preference). Cost parameters include the expense of providing the infrastructure to process a given challenge type, and to do so with particular response times and confidence levels under various system loads. Such parameters may vary over the course of operation of the authentication system, and as such may be updated periodically or in real-time for use in the stochastic queuing model.

These parameters may also be considered in terms of user context and system context. User context includes considerations related to the user, such as user abilities, user location, user historical access patterns, perceived authentication delay, and so on. System context includes considerations related to the system, including network delays, authentication system load, queue processing history, estimated arrival rates for authentication processing requests, costs of providing various service types and guarantees, service-type confidence levels, and other system-related considerations. Various such parameters of each of these types are possible and will vary from embodiment to embodiment.

In this embodiment, part of the analysis includes assigning weights to each consideration so that an overall assessment of the value of a scheme can be computed. For example, for class M, U is determined to have a security value of 3, a usability value of 2, and a cost value of 1 (as aggregated over all considerations of each type). Weights are 3 for security, 2 for usability, and −5 for cost. Hence the net value of U is 9+4−5=8. F is determined to add marginal values of 5 for security, 3 for usability, and 4 for cost. Hence the net marginal value of F is 15+6−20=1, and the challenge set {U, F} is viable for class M. This type of approach may be used for selecting both active schemes (such as by selecting the set with the largest value) and overall schemes (such as by selecting all sets above a threshold value).

Processing proceeds to step S265, where load shifting mod 365 applies temporal load shifting to one or more authentication factors of an active scheme where possible and as indicated by operational context. This is an example of adjusting request service timing. For example, suppose that at 4:52 p.m. on a certain day, the authentication system is experiencing an unexpected outage of one of its facial recognition processing servers. Local network traffic is also exceptionally high at this time due to a gaming competition being hosted on a shared local network. The effect of these delays is captured in the stochastic queuing system model, which concludes from this information and historical information about the rate of class M authentication requests that the system will likely soon be unable to provide acceptable response times to these requests in the current system context.

The system recognizes, however, that it can smooth demand and decrease perceived response time by pre-authenticating class M user requests with respect to the facial recognition component (F) of the {U, F} challenge set of the active scheme. That is, it can confirm user authenticity with respect to this component by acquiring and processing facial recognition data prior to an actual authentication request. It therefore promptly begins doing this for users who: (i) are expected, based on historical access patterns, to submit an authentication request within the next 1 minute; (ii) are currently engaging with their mobile device; (iii) are located, based on mobile device data, within the geographic region from which they normally submit their request; and (iv) have authorized the system to perform preemptive facial recognition authentication through such device. If the expected request arrives within the specified 1-minute time window, only the U challenge will remain to be completed. (See FIG. 8 and the accompanying discussion for another illustration of how this technique can improve perceived response time.) Here, both the collecting of facial recognition challenge response information and the processing of that information to make an authentication decision with respect to this challenge are time shifting. Alternatively, only one or another component of a challenge is time shifted. For instance, if the information collection component is a system bottleneck—say because network bandwidth is limited—but the information, once collected, can be quickly processed, only the information collection component of the challenge may be time shifted.

The above is a non-limiting example, and other pre-authentication eligibility criteria could be used. Additionally, the service types most amenable to load shifting are typically passive challenges not requiring intentional user participation, including context and soft biometric challenges such as user location, network devices/access points, how a device is being held, how the user navigates through mobile apps, how the user walks, how the user enters data into an app, behavioral data, security tokens, and the like, but there is no reason why such an approach can't be applied to active challenges (such as user name/password) in appropriate circumstances. Finally, the shifting may postpone certain challenges rather than accelerating them, including postponement until sometime after preliminary access has been granted. Temporal load shifting is a form of load shedding whereby an authentication load is shed from one point in time by shifting it to another point in time.

Processing proceeds to step S270, where authentication scheme adjustment mod 360 adjusts the active scheme to improve system performance. For instance, suppose load shifting as performed in the scenario described above was insufficient to deliver acceptable authentication delays, say because either there were not enough users that met the eligibility criteria or because the temporal shifting did not relieve enough system stress to make any significant improvements to authentication responsiveness. The system then decides to shift class M requests to the secondary challenge set {U, T} as permitted by the overall scheme in S260, shedding F outright in favor of lighter-weight challenge T.

Note that challenge- or service-type shedding does not necessarily substitute one service type for another (for example, class 4 requests from FIG. 4 may have their service type set shifted from {b,c} to {c}, eliminating b, or from {b,d} to {a,e}, where no service type is in common between the two sets) nor does it necessarily replace a "stronger" service type with a "weaker" service type from a security point of view. Instead, it shifts the active authentication scheme in favor of a different one based on some criteria—such as away from a service type with currently overloaded resources. In some cases, not only the active scheme but the overall scheme may be adjusted, whether by re-rating challenge choice sets or by adding or removing them from the overall scheme for a given class. In general, the stochastic queuing model of the authentication system can be used to monitor system dynamics over time and, based on changing system context and user context factors related to security, usability, and/or cost, can apply temporal and/or service type shedding to improve system performance.

An additional request handling parameter that can be adjusted by this embodiment system is to increase or decrease the set of resources available to process authentication requests. For instance, if the class M user request queue is becoming unacceptably long, the system may be able to procure additional servers for processing the facial recognition component of the class M challenge set, if additional servers are available and the cost of provisioning them is not prohibitive. This is yet another possible way in which the stochastic queuing model can be used to adjust the parameters of the authentication system to maintain a desired balance among system preferences such as those relating to security, usability, and cost.

III. Further Comments and/or Embodiments

Some embodiments of the present invention recognize the following facts, potential problems and/or potential areas for improvement with respect to the current state of the art: (i) complex authentication schemes, such as some forms of biometric authentication and context analysis, may require large quantities of sensor data; (ii) such authentication schemes can be computationally intensive; (iii) more generally, identity verification can result in long and even unacceptable latencies from the time of an authentication challenge until an authorization decision is made; (iv) verification latencies can be worse when there is congestion in the system due to excessive authentication requests, such as at the start of the business day or a shift change; and/or (v) interruptions for authentication can negatively impact a user's short term memory, slow down task performance, and/or result in user dissatisfaction with the authentication system.

Further, some embodiments of the present invention recognize: (i) that interaction with mobile devices is often brief and can be dominated by the time to authenticate; (ii) that because authentication is a secondary task, minimizing the effects of task interruption due to authentication is desirable; (iii) that when considering new authentication schemes—including various forms of biometric authentication, behavioral authentication, and authentication schemes that consider contextual factors—the system may introduce substantial delays to process the data (for example, processing a 10-second audio signal for voiceprint identification or verification may take 5-10 seconds, while identifying nearby Bluetooth devices may also take 15-30 seconds); (iv) that, in addition, cellular network data communication congestion can slow down the authentication process; and/or (v) that delays, including those from authentication systems, result in user frustration and degradation in performance of the user's primary task.

To formally account for such delays, some embodiments of the present invention model an authentication system as a series of queues, starting from the point of acquiring data from a sensor on an authentication device or client, through network delays, to server processing of the authentication data, and eventually to a response back to the client. For example, when performing multi-factor authentication using a mobile device and authenticating to a network-based service, data collected may include contextual data, such as location and visible network devices or access points, biometric data, and so on. This data is sent over the network to an authentication service where the data is processed to make authentication and authorization decisions (decision point). Each of the steps in this process introduces delays. As the network and/or authentication service reaches saturation, these delays increase.

Figure 5:
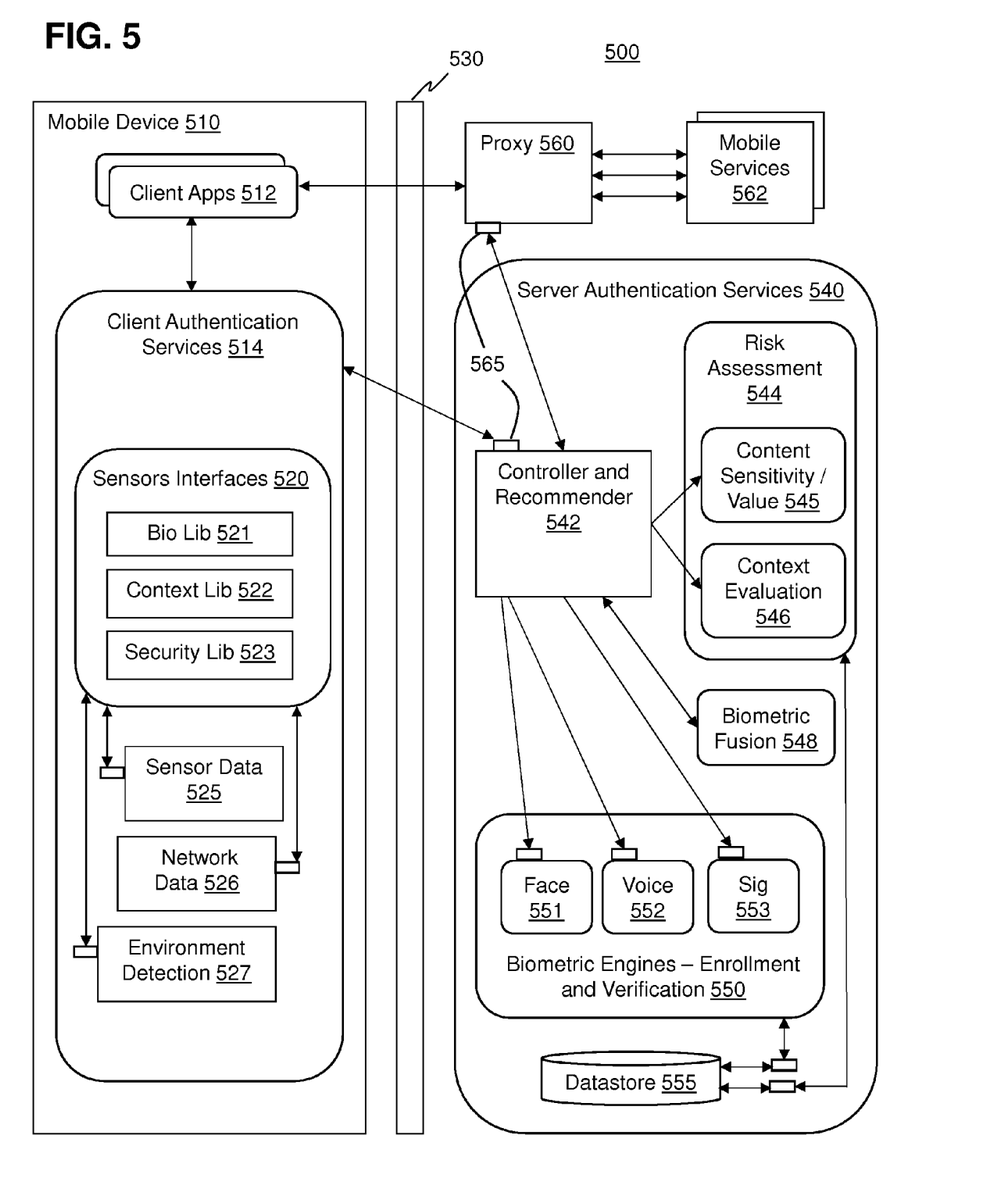
FIG. 5 is block diagram of a third embodiment of a system according to the present invention.

FIG. 5 depicts model 500 of mobile biometric authentication system according to an embodiment of the present invention. Model 500 includes: mobile device 510, including client apps (applications) 512, client authentication services 514, sensors interfaces 520 containing biometric library 521, context library 522, and security library 523, and components for detecting sensor data, network data, and the environment (sensor data 525, network data 526, and environment detection 527, respectively); firewall 530; server authentication services 540, including controller and recommender (mobile authentication services interface) 542, risk assessment component 544 containing content sensitivity/value component 545 and context evaluation component 546, biometric fusion component 548, biometric engines for enrollment and verification 550, including engines for verification of face (551), voice (552) and writing/signature (553), and datastore 555; proxy 560; and mobile services 562. Numerous queues 565 are also depicted. One of ordinary skill in the art will recognize that many architectural variations are possible—for example, the functions encapsulated by mobile device 510 in model 500 may alternatively be co-located with the functions encapsulated by server authentication services 540, and/or a proxy service may not be present.

Some embodiments of the present invention: (i) take into consideration factors such as the sensitivity of a user's requested operation; (ii) compute a risk estimate for such an operation (for example, for risk-based authentication and authorization); (iii) consider the values or weights that each authentication factor (context and other authentication techniques such as biometric authentication, password, personal identification number (PIN), and so on) contributes to authentication confidence, in light of the risk; (iv) estimate, based on these factors, how various authentication factors and authentication results (such as password, biometric verification results, and so on—may be a subset of all possible authentication factors) may contribute to an authorization decision (prioritize); (v) consider history of authentication challenge requests; and/or (vi) estimate the cost of performing the various stages of authentication, from sensor data acquisition to processing of the sensor data (for example, biometric authentication, time and location anomaly detection, user/device presence detection, user or security token information, and so on).

Further, some embodiments of the present invention recognize: (i) that some authentication factors (such as biometric data acquisition) require user interaction while others (such as context factor data collected from sensors) do not; (ii) that collecting some of these factor data can require non-trivial amounts of time, such as speaking a passphrase or collecting network device information from base stations or other mobile devices (802.11, Bluetooth media access control (MAC) addresses, and so on); (iii) that all the factors presented above can be taken into consideration to: (a) model the authentication process as a series of queues, (b) more effectively make authentication challenge decisions that can minimize authorization delays subject to security constraints with respect to a required authentication confidence; and/or (c) effectively produce an improved schedule of requests and/or request mode(s) to a client during an authentication process.

Consequently, some embodiments of the present invention: (i) use stochastic models to represent the authentication process; (ii) offer queue management and/or load shifting or shedding solutions whereby various parts of an authentication process can be addressed to mitigate delays; (iii) model the authentication process as a series of work queues, where each queue has a known processing duration and arrival rates for the authentication processing requests are estimated; (iv) consider factors such as: (a) confidence characteristics of the authentication methods in the system, (b) a risk level associated with an authentication request, and (c) methods for temporal load balancing (time shifting) and the effect of such time shifting on authentication confidence; and/or (v) take such factors into consideration to: (a) manage system processing load, (b) achieve authentication response time objectives, and (c) balance authentication confidence and risk (for example, by prioritizing or recommending lighter-weight authentication techniques such as pre-fetching authentication context factors (for example, location) when system loads may result in unacceptable processing delays (congestion) in order to minimize authentication latency as perceived by the user).

The following scenarios are illustrative:

Scenario 1: Based on past user behavior, the system recognizes that a user will want to access their email at about 9:00 a.m. at the office. The system schedules context challenges to the client to get location information starting just prior to the user's estimated first request to the system in order to turn on the Global Positioning System (GPS) and/or WiFi hardware on the user's smartphone so that the necessary data can be efficiently collected when requested by the authentication service. This may involve pre-fetching the location information. (Note that when collecting information and/or exercising control over user devices, care should be taken to do so in an appropriate fashion; this may include, for example: (i) making information disclosure to and obtaining advance approval from the user; and/or (ii) abiding by all applicable laws and regulations of the jurisdiction(s) involved).

Scenario 2: Based on past user behavior, the system determines that a user's first request for email access will be from that user's car at about 7:45 a.m. The system schedules context challenges just prior to the expected first request to discover whether the mobile device is in fact in the car (for example, via Bluetooth connected to the car's audio system), and that the car is on the expected roads. The system can then recommend that audio challenges, rather than a challenge requiring hands or eyes, be sent to the user when the first request for email arrives.

Scenario 3: An authentication system starts to reach input/output (I/O) capacity at 9:15 a.m., so the system starts to recommend authentication techniques that will lower I/O processing demand in cases where the authentication confidence can be achieved with these less resource-intensive capabilities (for example, replacing face and gesture recognition with signature and location challenges).

Scenario 4: For users requesting operations requiring relatively low authentication confidence (for example, read access to a phone directory) during high-demand periods, the system can occasionally poll the client device for contextual factors and/or soft biometric authentication information so that authentication can be performed in the background in anticipation of the resource request/authentication challenge. The processing of these contextual factors can be scheduled for processing at a lower priority than interactive challenges.

Scenario 5: A user approaches a bank automated teller machine (ATM) that is often used for cash withdrawals. This triggers activation of low-energy Bluetooth or GPS location-sensing mechanisms. The system responds by collecting any other appropriate contextual information and waits for the user to make a specific request. The availability of the contextual factors at the authentication server enables the server to respond more quickly with the authentication challenge once the user makes the actual request (for example, for a cash withdrawal).

A basic version of a class of stochastic models for complex authentication schemes is used in some embodiments of the present invention. It is a queuing model for systems with multiple classes of user requests and multiple authentication methods. Each user request is assigned into one class according to the desired level of authentication confidence in the identity of the user before authorizing a request. An authentication method may be a traditional user identification/password (or personal identification number (PIN)) pair, a particular form of biometric authentication, various forms of 2-factor authentication, and so on. Each method of authentication produces a level of authentication confidence of the user's identity.

The model used in some embodiments of the present invention: (i) is a mathematical queuing model for complex multi-factor authentication systems from an operational perspective; (ii) facilitates an understanding of several key tradeoffs involved in usability improvement; (iii) leads to the formulation of a joint stochastic optimization and control problem that can be solved to address the tradeoffs of (ii); and/or (iv) from a queuing-theoretic point of view, explicitly prescribes a service-time probability distribution to each arriving 'customer' (a standard term in queuing theory corresponding to authentication requests in the current setting) rather than having each arriving customer endogenously possess such a distribution.

As an example, consider an authentication system consisting of c identical authentication servers operating in parallel (c identical biometric verification engines, for example). There are I classes of user requests arriving at the system, and requests of class i (where i=1, 2, . . . , I) arrive according to a Poisson process with rate $\gamma_i$. Each request of class i is made by an imposter with probability $p_i$ and $p_1 < p_2 < \ldots < p_I$. Suppose, for example, that for each class of users some previous study/survey/research has been done and a rough estimate for the imposter likelihood has been obtained for each class. To those classes with relatively higher imposter likelihoods, it is desired to exercise more stringent authentication just to be sure of identity authenticity, because there is insufficient confidence that the request is being made by a genuine authorized user given the current level of risk. In other words, pre-authentication "identity confidence" for each class is measured by that class's corresponding "imposter frequency". Desired post-authentication identity confidence may be a result of a variety of factors, such as imposter frequency and consequences of a security breach, while actual post-authentication identity confidence may be characterized by the interplay of imposter frequency and the error rates of the authentication method(s) employed. One may think of each user request in this model as a resource access request initiated by a principal.

The system has J authentication methods, and if a request is processed by method j, it requires from one of the c servers a service time exponentially distributed with rate $\mu_j$ (where j=1, 2, . . . , J). Between the I authentication request arrival streams and the pool of c servers is a controller uniquely characterized by a function $\pi$: $\{1, \ldots, I\} \rightarrow \{1, \ldots, J\}$. This controller, or this function $\pi(\cdot)$, is chosen by the system designer to prescribe for (or recommend to) each of the I classes of requests one of the J authentication methods. For each fixed $\pi(\cdot)$, we have J streams coming out of the controller, each stream corresponding to one type of authentication job, where the rate of each of the J job streams depends on function $\pi$ as well as the $\gamma_i$'s for the classes of requests included in that stream. Each 'job' in this model corresponds to an authentication challenge to the client. Note that each class of requests, whose arrival rate is exogenously given, is associated with a particular imposter likelihood and each type of job, whose rate can be regulated by the controller, is associated with one of the J authentication methods.

Figure 6:
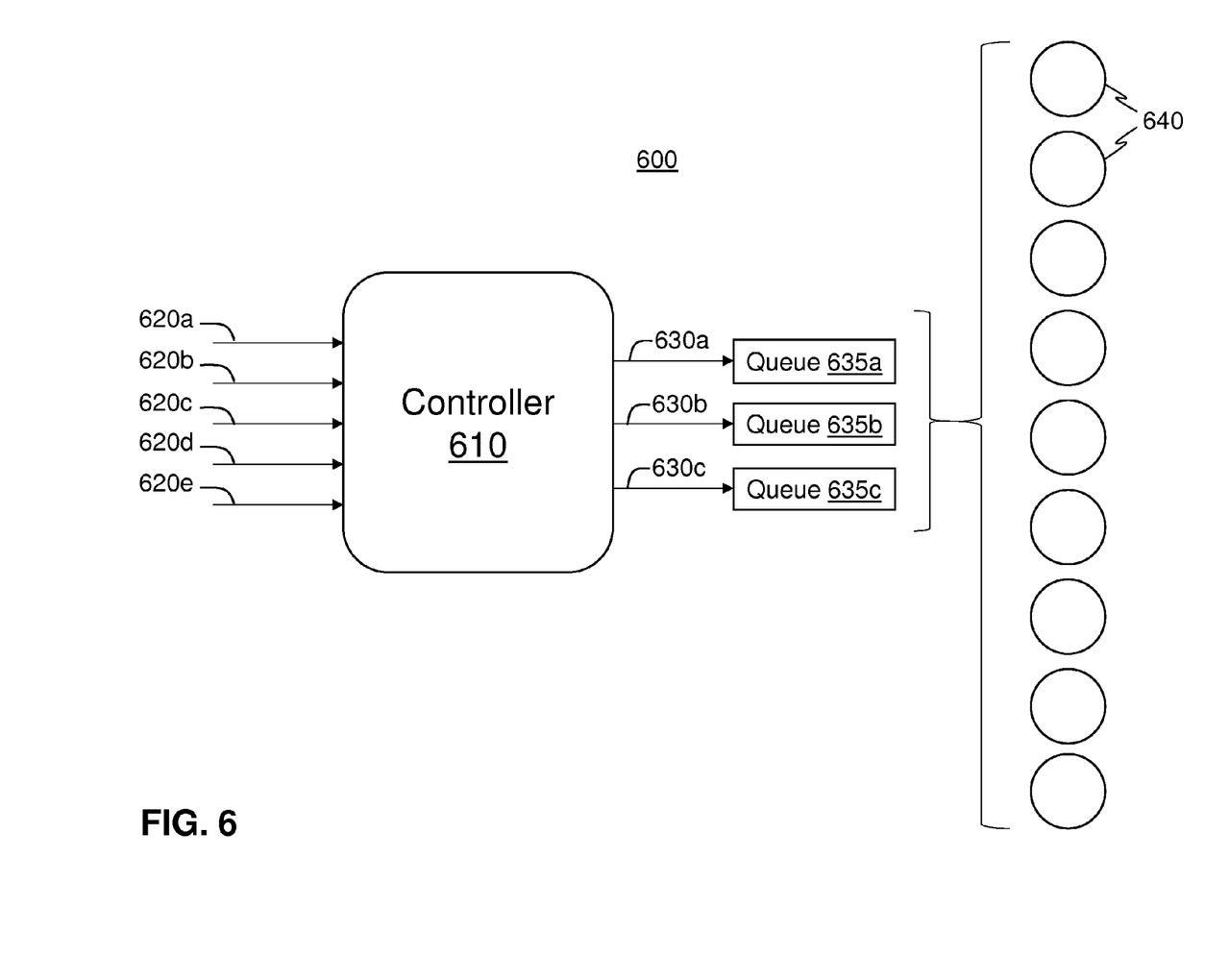
FIG. 6 is a model of a fourth embodiment of a system according to the present invention.

FIG. 6 depicts model 600, an example of the above model with I=5 and J=3. Model 600 includes: controller 610; five incoming authentication request streams 620a-e; three outgoing authentication job streams 630a-c respectively associated with authentication job queues 635a-c; and a pool of authentication servers 640. Each incoming request stream represents one of the I classes of authentication requests, while each of the authentication job streams represents one of the types of authentication jobs (such as user ID/password, thumbprint, 2-factor combination, and so on). Controller 610 maps each incoming request to an authentication job stream based on the request's class. For instance, controller 610 may map requests from request streams 620a and 620b to authentication job stream 630a, 620c and 620d to 630b; and 620e to 630c. Each job stream is thus also a Poisson process with the rate being the sum of the rates of the Poisson processes of the request streams of which it is composed. Thus $\gamma_{530a} = \gamma_{520a} + \gamma_{520b}$, $\gamma_{530b} = \gamma_{520c} + \gamma_{520d}$, and $\gamma_{530c} = \gamma_{520e}$. The requests then await service in the queue associated with the job stream to which they were assigned by controller 610.

As mentioned above, each type j job requires an $\exp(\mu_j)$ service time. Service time affects the delay and workload condition of the whole system, in turn affecting 'usability'. It may be helpful here to visualize a familiar airport scenario—if everyone needed to be authenticated too carefully when entering an airport, a huge waiting line might result such that arriving at a flight on time could become an unacceptably cumbersome process. A first-come-first-served discipline is used here, but other service disciplines known to those of ordinary skill in the art may be used as well. For a type j job, or equivalently for a request authenticated via method j, a 2-tuple parameter $(\alpha_j, \beta_j)$ is known to (or estimated by) the system: $\alpha_j$ represents the false rejection probability (the type I error probability) and $\beta_j$ the false acceptance probability (the type II error probability). Therefore, if $\pi(i)=j$, or in other words if user class i is prescribed authentication method j by the controller, then a class i request: (i) is made by an imposter and properly rejected with probability $p_i(1-\beta_j)$; (ii) is made by an imposter and incorrectly accepted with probability $p_i\beta_j$; (iii) is made by an authentic user and incorrectly rejected with probability $(1-p_i)\alpha_j$; (4) is made by an authentic user and properly accepted with probability $(1-p_i)(1-\alpha_j)$.

Some embodiments of the present invention recognize that, based on the description of the example model above, some interesting tradeoffs arise. One tradeoff is between security and (congestion) delay. From a pure security perspective, the system designer wants to set up the controller function $\pi(\bullet)$ such that all types of user requests are authenticated by methods with the highest degree of authentication confidence (lowest $\beta_j$ value). However, because these methods may be the ones with the longest service times (smallest $\mu_j$), doing this may lead to significant system delays. A balance must be struck between authentication confidence and authentication speed.

Another tradeoff is the economic tradeoff between system performance (including security and delay) and cost. For instance, system performance can be improved by increasing the number of servers c, but this is done at a cost. A third tradeoff is between security and usability. The usability of an authentication method or system is partly correlated with the tail probability of the delay time in using it (in other words, the probability that for a given request, a user experiences a delay exceeding a certain threshold, rather than the average delay, significantly affects the usability of the system). In the above model, the choices of both $\pi(\bullet)$ and c determine the delay tail probability, which in turn affects the usability.

Some embodiments of the present invention recognize, therefore, that the joint stochastic optimization and control problem in the context of the above model is to choose the number of servers c and a controller $\pi$ that optimizes security, delay, and usability subject to practical constraints such as cost. Some embodiments of the present invention recognize: (i) that balancing security, delay, cost, and usability together over time (for instance, via the dynamic nature of c and $\pi$), and in particular balancing security versus usability, is an important problem; (ii) that frequent authentication is commonplace nowadays and spending too much time on authentication is undesirable, but so is compromising security when it matters; (iii) that the circumstances users are in vary significantly over this spectrum of relative importance of usability and security, from user to user, and from time to time (for instance, sometimes security is far more important than usability, but other times security is only slightly more important than usability); and/or (iv) that conventionally there was less need for authentication and there was not much conflict between authentication and usability, and less diversity in the spectrum of relative importance of usability and security.

In some embodiments of the present invention, real-time scheduling is adopted to further improve system performance. For example, some of the user requests may be delay-tolerant, wherein, from a mathematical modeling point of view, the request arrival times may be altered to any other point within a time window of, say, 1-5 minutes. This load shedding approach can be useful for achieving temporal load balancing, especially when the system workload varies over time. Consequently, the overall latency for authentication can be substantially reduced.

Figure 7:
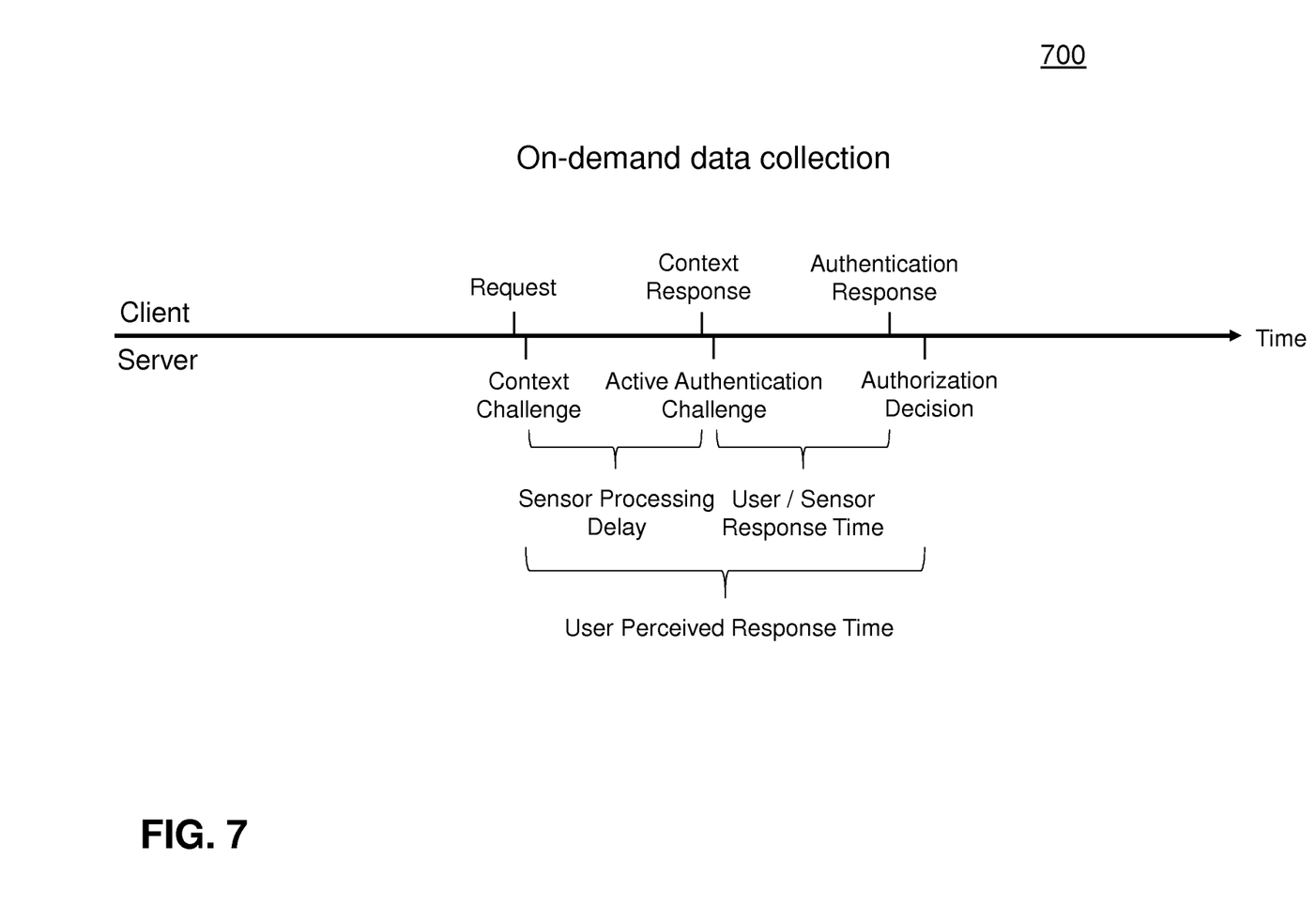
FIG. 7 is a first timing diagram showing authentication system event information that is helpful in understanding authentication system behavior in embodiments of the present invention.
Figure 8:
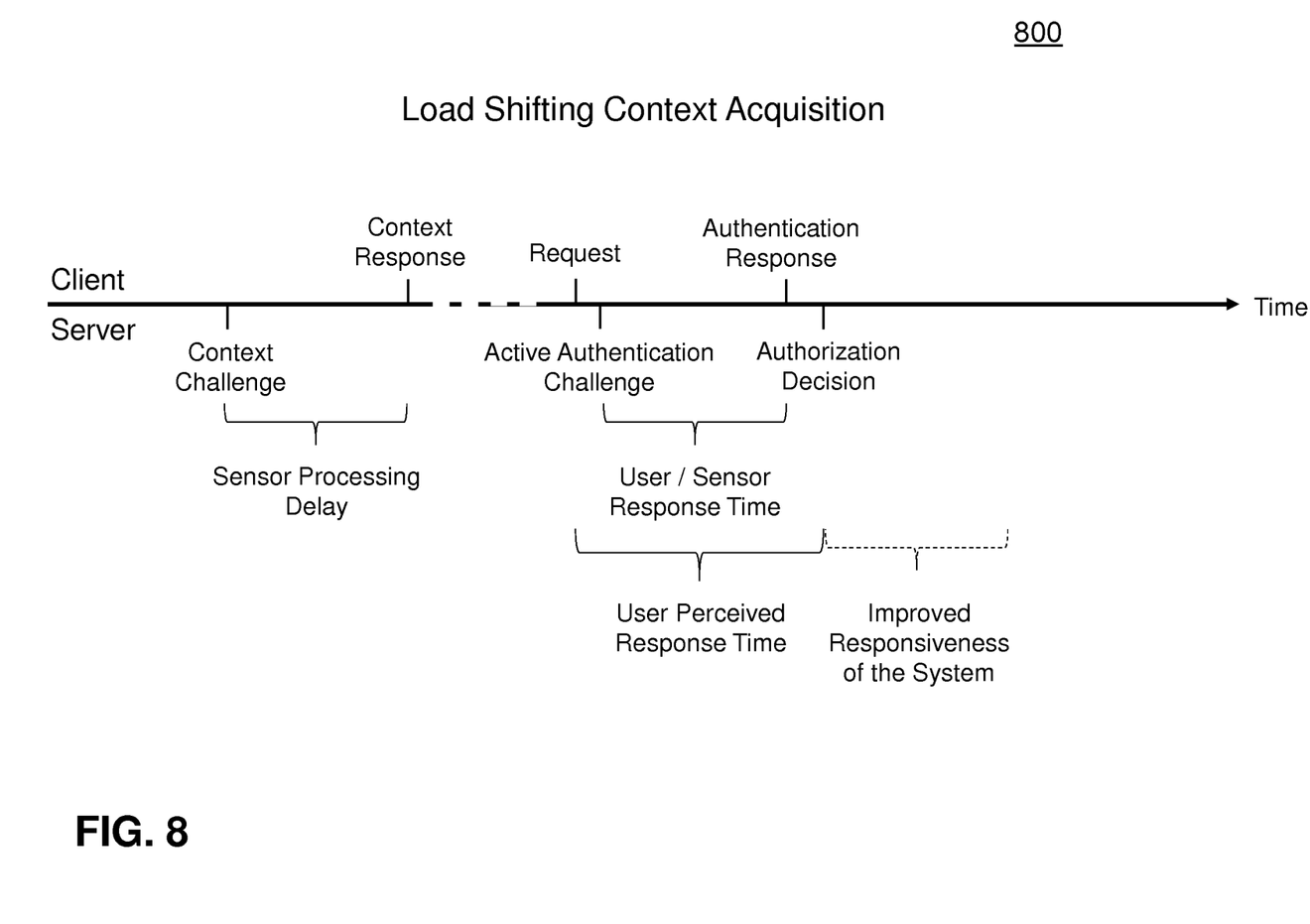
FIG. 8 is a second timing diagram showing load shifting of context acquisition, information that is helpful in understanding authentication system behavior in embodiments of the present invention.
Figure 9:
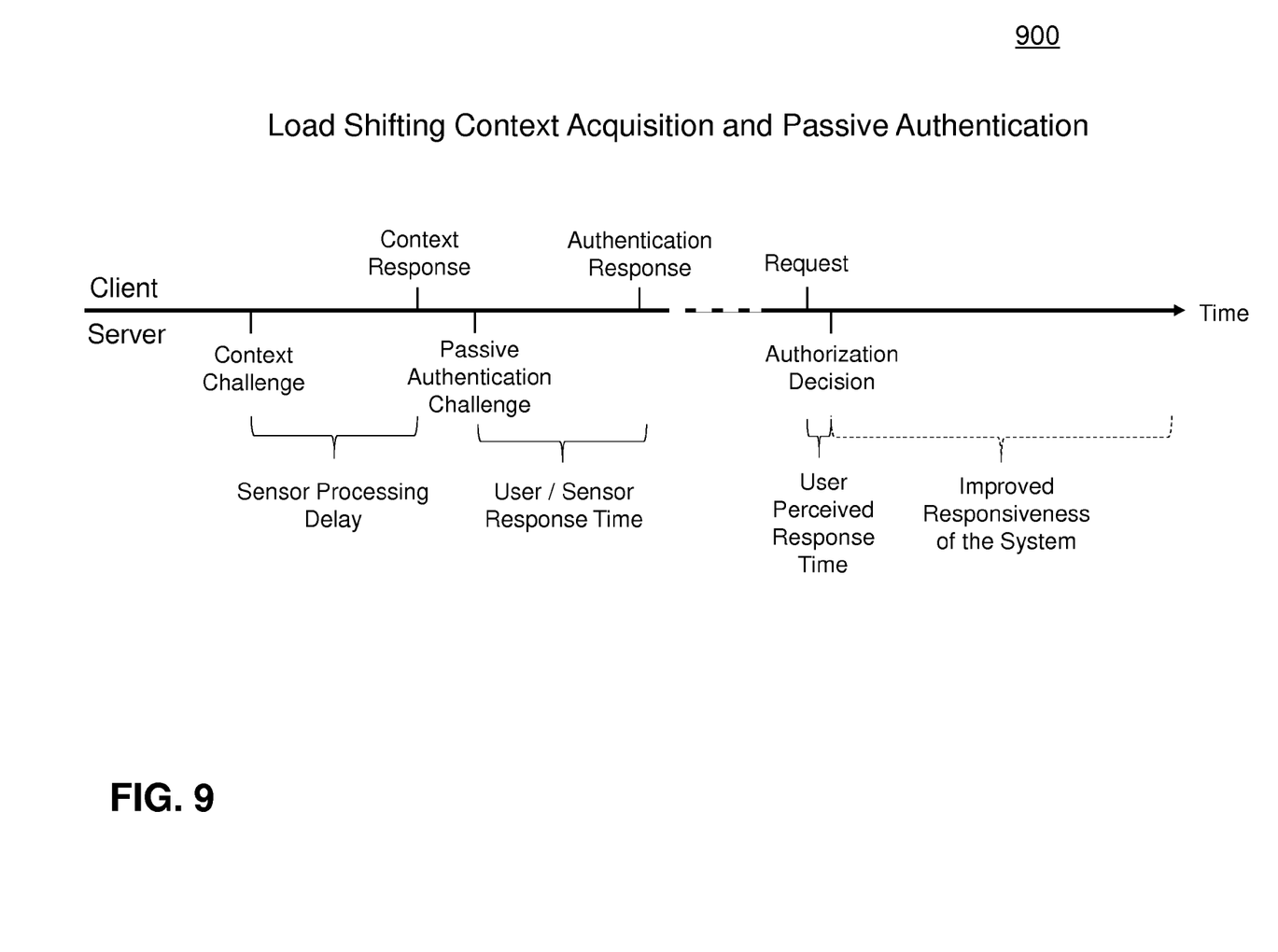
FIG. 9 is a third timing diagram showing load shifting of context acquisition and another passive authentication challenge, information that is helpful in understanding authentication system behavior in embodiments of the present invention.

FIGS. 7, 8, and 9 show the effect of load shifting based on estimates of when context and/or authentication results are needed by the authentication service. Timeline 700 of FIG. 7 depicts a straightforward approach to implementing an authentication system, with data collected in an on-demand fashion as needed. A client request is made, a context challenge is triggered, the response triggers an active authentication challenge, and the response to that challenge finally results in an authentication/authorization decision. This scenario represents how systems typically process resource access/authentication requests, with no load shifting. The response time from the point of view of the user includes both the time to process the context challenge and the time to process the active authentication challenge.

Timeline 800 of FIG. 8 depicts an authentication timeline with a time-shifted context challenge. The context challenge has been load shifted in anticipation of the need for context data. The system anticipates an authentication request (such as, for example, based on historic request data, the user's current behavior, or periodic background processing) and initiates the context challenge prior to receiving an actual authentication request from the user. The result is that context challenge portion of the authentication process is performed ahead of time, improving the overall perceived responsiveness of the system by reducing the authentication latency from the point the actual request is made. The perceived user response time can be substantially decreased if, for example, the context sensor data acquisition time is long.

Timeline 900 of FIG. 9 depicts an authentication timeline with both a time-shifted context challenge and a passive authentication challenge that is also initiated prior to the actual user request. This represents a more aggressive approach to authentication where passive collection of authentication credentials is employed, such as with soft biometrics or cognitive or behavioral biometrics, providing a further benefit to perceived system responsiveness (and/or intrusiveness, since acquisition of such "soft" data may not require the need for active user participation) but may also have lesser authentication confidence than traditional biometric or knowledge-based authentication techniques. Soft biometrics include how a mobile device is being held, how a user navigates through mobile apps, how a user walks, and how a user enters data into an app, to name a few examples. Other passive authentication techniques include collecting voice/audio samples used for navigating through applications and comparing these audio clips to a voice biometric enrollment sample.

As FIGS. 7-9 illustrate, there can be substantial improvements in system responsiveness to resource requests requiring context and authentication when load shifting is employed. Note, however, that in the general context of authentication systems, load-shifting various components of the authentication process may weaken authentication confidence. Load-shifting thus adds another degree of freedom when considering the various tradeoffs discussed earlier, but does not eliminate the need to strike an appropriate balance among them.

Some embodiments of the present invention: (i) recognize that a challenge of complex authentication systems is that they can introduce undesirable latencies, thus reducing the overall usability of the system; (ii) use stochastic models to understand system performance and identify performance bottleneck; (iii) reduce perceived authentication latency through various queue management mechanisms; (iv) use load-shifting to reduce the overall perceived system delay in authenticating a user; (v) consider user context and/or system context in determining appropriate authentication methods and timings; (vi) consider historical access patterns, system load, network delays, and/or other factors in determining appropriate authentication methods and timings; (viii) assign weights to each of the authentication methods in order to decide which sets of authentication methods are appropriate for achieving a desired authentication confidence.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Multifactor authentication system: as used herein, refers to both systems that use information from multiple authentication information classes (for example, something a user knows plus something the user has plus something a user is) and systems that use multiple elements of any particular authentication information class (for example, a user name and password combination plus a CAPTCHA-type response).

Authentication method: a collection of techniques which together are used to authenticate the identity of a requester; also an element of such a method (that is, a single technique; also known as an authentication method element); three examples are: (i) username/password, (ii) location, and (iii) a two-factor method that uses both username/password and location.

What is claimed is:

1. A method comprising:
performing, by a hardware processor, operations of a pre-authentication process comprising:
obtaining a stochastic queuing model of a computerized system for authenticating users, a set of preferences for handling authentication requests, and a set of operational parameter values, wherein the stochastic queuing model includes two or more classes of users, a queue for each class of users, and quantifies an overall authentication delay of the computerized system for authenticating users;
determining, based at least in part on the model and the operational values, that adjusting an authentication scheme will improve a probable degree to which the authentication system will meet the set of preferences;
responsive to the determination that adjusting the authentication scheme will improve the probable degree to which the system for authenticating users will meet the set of preferences, adjusting the authentication scheme of the computerized system for authenticating users; and
performing, by the hardware processor, an authentication based on authentication scheme determined by the pre-authentication process.

2. The method of claim 1 wherein obtaining comprises generating the stochastic queuing model of the computerized authentication system.

3. The method of claim 1 wherein the set of preferences includes information related to at least one of the following: authentication method confidence, authentication method usability, or authentication method cost.

4. The method of claim 1, wherein adjusting the authentication scheme comprises adjusting a value of a first request handling parameter by adjusting at least one of: request service type, request service timing, or request processing resources.

5. The method of claim 4 wherein:
the first request handling parameter relates to request service type; and
the adjustment of the first request handling parameter includes replacing a first authentication method with a second authentication method.

6. The method of claim 3 wherein:
the set of preferences includes information related to authentication method usability; and
the authentication method usability information includes a maximum acceptable authentication request service delay.

7. The method of claim 1 wherein the stochastic queuing model includes stochastically modeling authentication request arrival rates for multiple classes of authentication requests.

8. The method of claim 1 wherein the stochastic queuing model includes stochastically modeling service request delays for multiple authentication service types.

9. The method of claim 1 wherein the set of operational parameter values relate to at least one of system context and user context.

10. The method of claim 1 wherein the set of operational parameter values includes value(s) for at least one of: user historical access patterns, authentication system load, network delays, user device location, authentication queue processing history, estimated arrival rates of authentication requests, and risk associated with making an erroneous authentication decision.

11. The method of claim 1, wherein adjusting the authentication scheme includes adjusting a value of a first request handling parameter by applying load shedding to a first authentication request.

12. The method of claim 11 wherein the load shedding includes presenting a passive authentication challenge for the first authentication request to a point in time that precedes the first authentication request.

13. The method of claim 11 wherein:
the load shedding includes replacing a first set of authentication challenges with a second set of authentication challenges; and
the first set of authentication challenges contains at least one challenge not in the second set of authentication challenges.

14. A non-transitory computer program product comprising a non- transitory computer readable storage medium having stored thereon:
- instructions stored on the computer readable storage medium for a hardware processor to perform a pre-authentication process that includes:
- instructions executable by a device to cause the device to obtain a stochastic queuing model of a computerized system for authenticating users, a set of preferences for handling authentication requests, and a set of operational parameter values, wherein the stochastic queuing model includes two or more classes of users, a queue for each class of user, and quantifies an overall authentication delay of the computerized system for authenticating users;
- instructions executable by a device to cause the device to determine, based at least in part on the model and the operational values, that adjusting an authentication scheme will improve a probable degree to which the authentication system will meet the set of preferences;
- instructions executable by a device to cause the device to adjust, responsive to the determination that adjusting the authentication scheme will improve the probable degree to which the system for authenticating users will meet the set of preferences, the authentication scheme of the computerized system for authenticating users; and
- instructions stored on the computer readable storage medium for the hardware processor to perform an authentication based on the authentication scheme determined by the pre- authentication process.

15. The non-transitory computer program product of claim 14 wherein the stochastic queuing model includes stochastically modeling authentication request arrival rates for multiple classes of authentication requests and service request delays for multiple authentication service types.

16. The non-transitory computer program product of claim, 14 wherein adjusting the authentication scheme includes adjusting a value of a first request handling parameter by applying load shedding to a first authentication request.

17. A computer system comprising:
- a hardware processor(s) set; and
- a non-transitory computer readable storage medium; wherein:
- the processor set is structured, located, connected or programmed to execute instructions for a pre-authentication process stored on the computer readable storage medium,
- the instructions including:
  - instructions executable by a device to obtain a stochastic queuing model of a computerized system for authenticating users, a set of preferences for handling authentication requests, and a set of operational parameter values, wherein the stochastic queuing model includes two or more classes of users, a queue for each class of user, and quantifies an overall authentication delay of the computerized system for authenticating users;
  - instructions executable by a device to cause the device to determine, based at least in part on the model and the operational values, that adjusting an authentication scheme will improve a probable degree to which the authentication system will meet the set of preferences;
  - instructions executable by a device to cause the device to adjust, responsive to the determination that adjusting the authentication scheme will improve the probable degree to which the system for authenticating users will meet the set of preferences, the authentication scheme of the computerized system for authenticating users; and
  - the processor set is structured, located, connected or programmed to execute instructions for an authentication based on the authentication scheme determined by the pre-authentication process.

18. The system of claim 17 wherein obtaining the stochastic queuing model comprises generating the stochastic queuing model.

19. The system of claim 17, wherein adjusting the authentication scheme comprises adjusting a value of a first request handling parameter by adjusting at least one of: request service type, request service timing, or request processing resources.

20. The system of claim 17, wherein adjusting the authentication scheme includes adjusting a value of a first request handling parameter by applying load shedding to a first authentication request.

\* \* \* \* \*